United States Patent [19]
Gyugyi et al.

[11] 4,234,843
[45] Nov. 18, 1980

[54] STATIC VAR GENERATOR WITH DISCRETE CAPACITIVE CURRENT LEVELS

[75] Inventors: Laszlo Gyugyi, Pittsburgh; Peter Wood, Murrysville, both of Pa.

[73] Assignee: Westinghouse Electric Corp., Pittsburgh, Pa.

[21] Appl. No.: 942,837

[22] Filed: Sep. 15, 1978

[51] Int. Cl.³ .............................................. H02J 3/18
[52] U.S. Cl. .................................................. 323/119
[58] Field of Search ........................ 323/102, 105, 119

[56] References Cited
U.S. PATENT DOCUMENTS

| | | | |
|---|---|---|---|
| 3,936,727 | 2/1976 | Kelly, Jr. et al. | 323/102 |
| 3,999,117 | 12/1976 | Gyugyi et al. | 323/119 |
| 4,047,097 | 9/1977 | Gyugyi et al. | 323/119 |
| 4,104,576 | 8/1978 | Frank | 323/102 |
| 4,139,723 | 2/1979 | Havas | 323/119 X |

*Primary Examiner*—William M. Shoop
*Attorney, Agent, or Firm*—M. J. Moran

[57] ABSTRACT

A VAR generator is taught in which a thyristor controlled inductive element is used to provide lagging VAR's and a bank of parallel capacitors, each of which may be switched into and out of circuit cooperation independent of the other, is used to provide discrete levels of leading VAR's. The inductive element is utilized in conjunction with the discrete levels of leading VAR's to provide a continuum of VAR generation in the region between the discrete levels by providing continuously variable compensating or cancelling current for interaction with the discrete levels to provide an overall continuous range of VAR generation in the leading VAR region.

9 Claims, 13 Drawing Figures

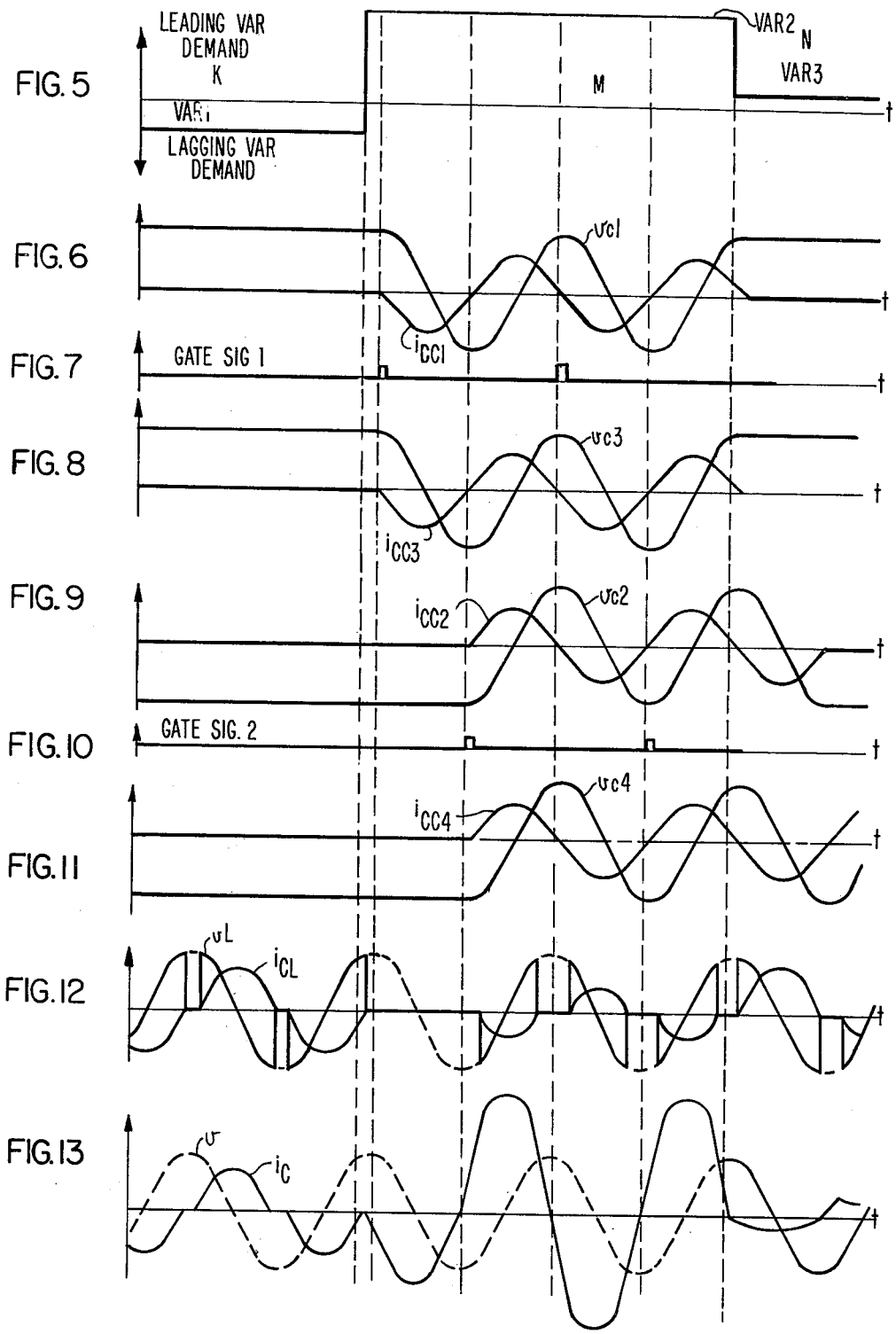

STATIC VAR GENERATOR WITH DISCRETE CAPACITIVE CURRENT LEVELS

CROSS REFERENCE TO RELATED APPLICATIONS

Subject matter of this invention is related to that disclosed in U.S. patent application Ser. No. 942,839 entitled "Hybrid Switched Capacitor-Controlled-Inductor Static VAR Generator and Control Apparatus".

BACKGROUND OF THE INVENTION

The subject matter of this invention relates generally to VAR generators and more specifically to static VAR generators employing switched inductors used in conjunction with switched capacitors.

It is known to make VAR generators by connecting a fixed capacitor and a switched inductor in parallel across two lines of a voltage system to be regulated or controlled by the VAR generator. A suitable control system is provided for sending an output signal to the switch portion of the switched inductor to establish a conduction interval during a predetermined period of time. The conduction interval allows current to flow for a portion of the predetermined period of time, thus generating an inductively reactive current which interacts with fixed capacitively reactive current to produce a net reactive current which cooperates with the voltage across the lines to produce reactive power. The predetermined interval of time is usually one-half cycle of the line voltage. Consequently, on a half cycle-by-half cycle basis, the switching interval can be changed to provide differing amounts of reactive power as is determined is necessary by the calculating or control portion of the system. Systems of the previous type can be found in U.S. Pat. No. 3,936,727, issued Feb. 3, 1976 to F. W. Kelly, Jr. and G. R. E. Laison and U.S. Pat. No. 3,999,117, issued Dec. 21, 1976 to L Gyugyi et al. The latter patent is assigned to the assignee of the present invention. The value of capacitance and inductance is usually chosen in the prior art so that at a moderate conduction interval for the switched inductor, the thusly produced inductive current is approximately equal to the fixed capacitive current, thus producing zero VAR. Consequently, if the conduction interval is increased, the amount of inductive current increases, producing a net inductive reactive current. On the other hand, if the conduction interval is decreased, the inductive current is decreased, producing a net capacitive reactive current. This gives positive and negative VAR capability to the system. A system of this type has a number of problems, however. One problem lies in the fact that even at standby or a disposition of no VAR generation, appreciable power generation is required in each of the inductive and capacitive components of the system. Said another way, in a system of the type previously mentioned, significant inductive current is generated at the time when no VAR correction or production is required because the significant inductive current is utilized to cancel the oppositely phased capacitive current. This means that there are relatively high standby losses. Furthermore, for any given amount of VAR correction, either negative or positive, a minimum capacitance and inductance is required. An improvement on the aforementioned system includes utilization of an inductive branch and a capacitive branch in which the inductive branch operates independently of the capacitive branch, and vice versa. In this system, at standby neither the inductive portion of the system nor the capacitive portion of the system conducts appreciable current and therefore the standby losses are lower than in the aforementioned system. Net inductive current is provided by using the inductive portion of the system exclusively; and net capacitive current is provided by using the capacitive portion of the system exclusively. However, a problem is present with this kind of system in that the capacitive branch of such a system is not conducive to continuous switch control over a wide range of capacitive currents, as is the case with the inductive portion of the system. In the prior art, therefore, the capacitive portion of such a system utilizes a bank of discrete capacitors, each having a separate switch. The net capacitive reactance for capacitive VAR production is provided by judiciously picking combinations of capacitors in the bank of capacitors to provide discrete values of capacitance. Nevertheless, such a system has the inherent disadvantage of only allowing discrete values of capacitive current to be produced. Thus, continuous control is difficult, if not impossible. In the range of capacitive VAR demand, only a relatively few values of capacitive current are available because of the discrete nature of the system. As a consequence, VAR compensation or correction in the capacitive current range tends to be an approximation. It would be advantageous, therefore, if a system could be found which utilized continuous VAR control in both the capacitive and the inductive regions, but in which standby losses were minimized and in which the relative size of the inductive and capacitive components were reduced below the previously discussed minimum for the same range of VAR correction.

SUMMARY OF THE INVENTION

In accordance with the invention, a continuous range of VAR correction which covers both negative and positive VAR generation and which has minimum standby losses and uses relatively small components for a given range of correction is disclosed. In particular, an inductive apparatus and a capacitive apparatus are utilized in conjunction in such a manner that the inductive apparatus provides essentially the entire VAR generation for net inductive VAR demand, but where discrete capacitors are utilized in conjunction with the same inductor to provide VAR generation over a continuous range for net capacitive VAR demand. This is accomplished by switching in individual capacitors or combinations thereof from a bank of capacitors, thus providing a discrete level of capacitive current for VAR generation in the capacitive region, from which is subtracted inductive current from the inductive portion of the circuit to produce a continuous range of net capacitive VAR's.

BRIEF DESCRIPTION OF THE DRAWINGS

For a better understanding of the invention, reference may be had to the preferred embodiments thereof, shown in the accompanying drawings, in which:

FIG. 5 shows a graph of leading and lagging VAR demand vs. time for a hypothetical case for the apparatus of FIG. 3;

FIG. 6 shows a plot of voltage vs. current for capacitor C1 of FIG. 3;

FIG. 7 shows gate signals for firing capacitors C1 and C3 of FIG. 3;

FIG. 8 shows a plot of voltage vs. current for the capacitor C3 of FIG. 3;

FIG. 9 shows a plot of voltage vs. current for the capacitor C2 of FIG. 3;

FIG. 10 shows the gate signal for firing the capacitors C2 and C4 of FIG. 3;

FIG. 11 shows a plot of voltage and current for the capacitor C4 of FIG. 3;

FIG. 12 shows a plot of the voltage and current for the inductor of FIG. 3; and

FIG. 13 shows a plot of the voltage and net compensating current for the apparatus of FIG. 3.

DESCRIPTION OF THE PREFERRED EMBODIMENTS

Figure 1:
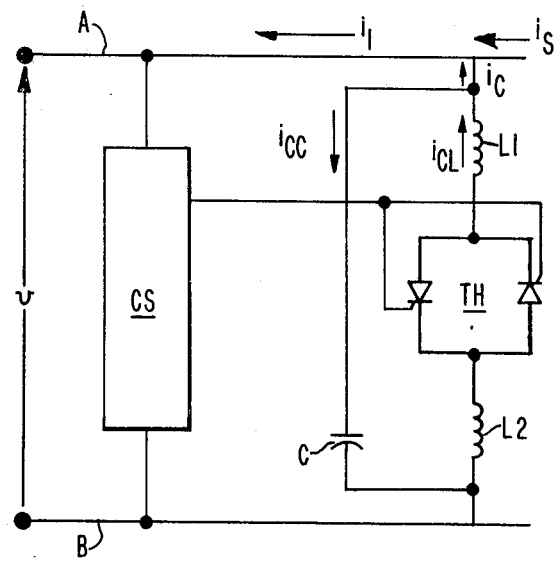
FIG. 1 shows a prior art, fixed capacitor, switch controlled inductor VAR generator.
Figure 2:
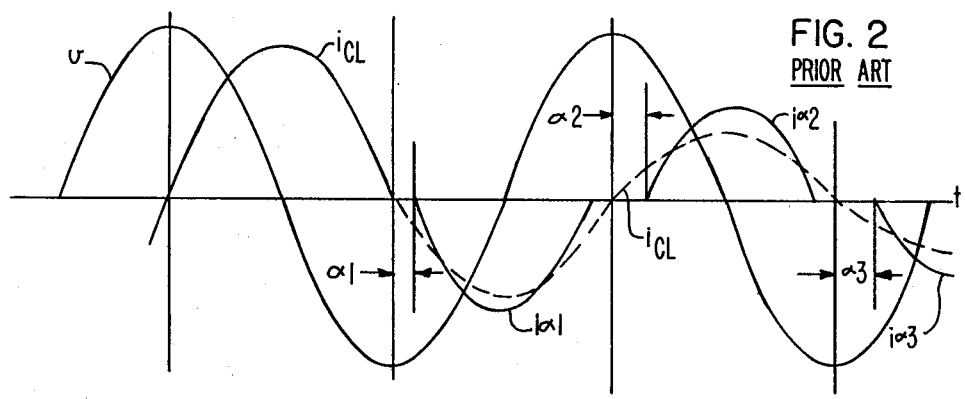
FIG. 2 shows the relationship of voltage and inductor current for the apparatus of FIG. 1.

Referring now to the drawings and FIG. 1 and FIG. 2 in particular, a prior art static VAR generator of the fixed capacitor and controlled inductor type is shown. In this case, a voltage v is to be maintained at a relatively fixed value between two lines A and B. A current $i_l$ flows in the lines. Current $i_l$ is a sum of source current $i_s$ and compensating current $i_c$. Compensating current $i_c$ in turn is a sum of net inductive current $i_{cL}$ and net capacitive current $i_{cc}$. If net inductive current $i_{cL}$ and net capacitive current $i_{cc}$ are equal to each other, then current $i_c$ is equal to zero and current $i_l$ is equal to current $i_s$. A control system CS is provided for determining whether the circuit variables, such as current $i_l$ and voltage v are in a condition or state necessitating the generation of compensating current $i_c$. Said in another way, the control system decides whether VAR generation is necessary, what magnitude of reactive power is to be supplied and whether the reactive power should be net positive or net negative. To accomplish this, a fixed capacitor C is provided between the lines A and B. This capacitor has the fixed current $i_{cc}$ flowing therein as a function of the voltage v. Connected in parallel with the fixed capacitor C is the series combination of two inductors L1 and L2 (which may be replaced by a single inductor) and a bidirectional thyristor switch TH. By varying the phase back angle α1, α2, α3, etc., as shown in FIG. 2, the net current $i_{cL}$ may be varied during specific intervals which may correspond to the half cycle intervals of the alternating current and voltage. As the phase back angle α1, α2, α3, etc. is made larger, the current iα1, iα2, iα3, etc. becomes smaller, thus providing a smaller component of fundamental current in the inductive branch for the particular half cycle in question, thus providing a lower value of current $i_{cL}$. As the value of current $i_{cL}$ dips below the value of current $i_{cc}$, compensating current $i_c$ becomes net capacitive; on the other hand, if the phase back angle is such that the current $i_{cL}$ is relatively larger than $i_{cc}$, then the compensating current $i_c$ is inductive.

Figure 3:
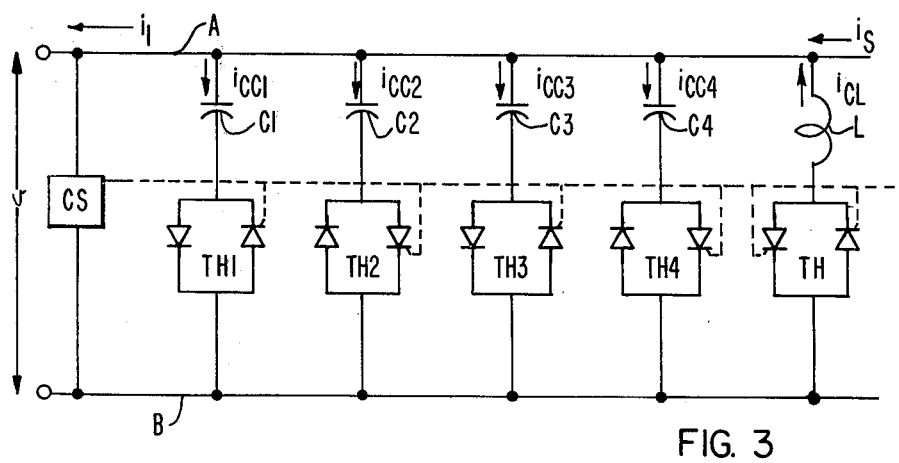
FIG. 3 shows a VAR generator utilizing the principles of the present invention in which a four capacitor bank of capacitors is utilized in conjunction with a single switched inductor.

FIG. 3 shows the lines A and B having the same voltage v impressed thereacross and the currents $i_l$ and $i_s$ flowing therein. In this case, compensation is provided by four capacitive elements C1 through C4 and an inductive element L. Each of the capacitive elements has a switch TH1 through TH4 connected thereto for bringing the capacitive elements C1 through C4, respectively, into or out of circuit conduction. In the specific embodiment shown in FIG. 3, the thyristor switches TH1 through TH4 are bidirectional but nevertheless have only one thyristor element shown on the right thereof. The other conduction element is a diode connected in polarity opposition to the thyristor element in each case. Half of the thyristor elements are connected in one direction and the other half of the thyristor elements are connected in the other direction. This allows every other capacitor to charge to a positive voltage while the other capacitors charge to negative voltage, thus producing minimum circulating current within the VAR generator capacitive branch and capability for quick compensation on either a positive or negative half cycle. Each of the capacitive elements C1 through C4 is capable of generating capacitive currents icc1 through icc4, respectively, depending upon the conduction status of the switches TH1 through TH4. It is possible in this case for any or all of the capacitive elements C1 through C4 to be interconnected in parallel circuit relationship, thus producing any of a discrete number of net capacitive currents for compensation. The inductive element L, on the other hand, which is connected to a bilateral thyristor switch TH, produces a current ic1 over a continuous range as determined by the phase back angle of the thyristor switch TH. This is similar to the situation described previously with respect to the thyristor conduction in the prior art. A control system CS is provided between the lines A and B for sensing circuit variables, such as the voltage v and the current $i_l$, for example, for thus producing signals which are applied to the gates of the various thyristors for causing conduction in a manner deemed appropriate for proper VAR compensation. Such a control system is described in greater detail in copending application Ser. No. 942,839.

Figure 4:
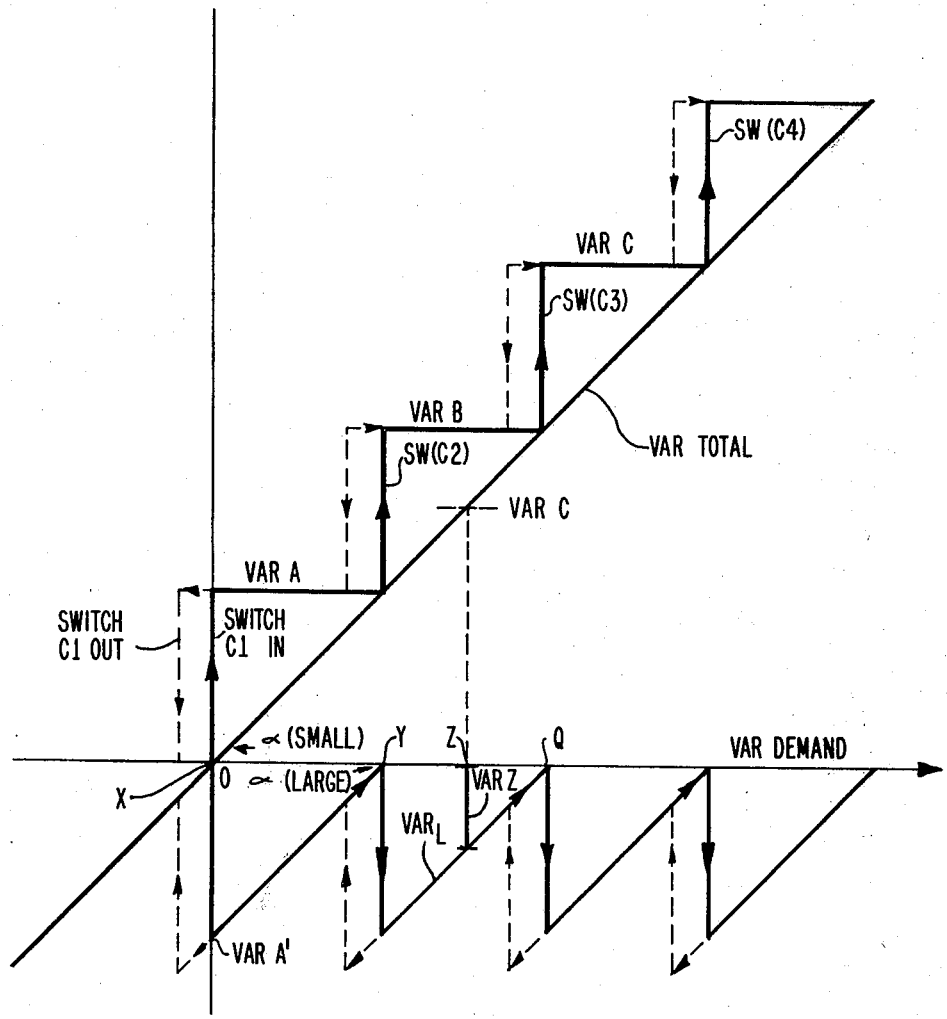
FIG. 4 shows a plot of VAR demand vs. VAR output for the apparatus of FIG. 3.

Referring now to FIG. 4, a plot of VAR output vs. VAR demand is shown for the apparatus of FIG. 3. To the left in FIG. 4, the VAR demand is considered negative, while to the right, VAR demand is considered positive. In a like manner, to the top of FIG. 4, VAR output is considered positive, while to the bottom of FIG. 4, VAR output is considered negative. In the ideal situation, VAR output equals VAR demand; and the line VAR TOTAL represents such an ideal situation. This means that as circuit conditions change from a disposition in which no VAR correction is required to a disposition in which VAR correction is required or desired, the control system CS will operate to calculate the VAR demand, for example, and to provide appropriate signals to the various thyristors shown in FIG. 3 to produce a VAR output which is ideally equal to the VAR demand. In actuality, the matching of VAR output with VAR demand in the inductive region shown in the lower left quadrant of FIG. 4 is relatively easily obtainable because of the continuously controllable nature of the inductive current $i_{cL}$, as illustrated in the prior art of FIG. 2, for example. However, because of the discrete nature of VAR compensation with regard to the capacitive elements, VAR generation in the positive region shown in the upper right portion of FIG. 4 is more difficult. In this case, the controller CS senses the time for positive VAR correction and switches in capacitor C1 for instance, to provide a net level of capacitive VAR correction VAR-A. Even though the demand for VAR correction in this region may be significantly less than VAR-A, if the capacitive element C1 were the only element available for VAR correction, as is the case in the prior art, the system would have to operate with larger VAR correction than is necessary, thus introducing an undesirable error. However, the present invention utilizes the inductive element with its phase back control in a second mode of operation. In the second mode, the inductive element L operating in conjunction with the thyristor TH and the control system CS produces sawtooth inductive current, such as is shown in FIG. 4. At location X, for example on the VAR demand curve, no VAR generation is required and so the net capacitive VAR-A is compensated by opposite and equal net inductive current VAR-A'. In this case, the phase back angle $\alpha$ is relatively small or zero. As VAR demand increases, the phase back angle $\alpha$ becomes larger until a point Y is reached in which VAR-A is the exact amount of VAR's demanded. As VAR demand increases above point Y, a second capacitive element C2 is switched in, thus producing net capacitive VAR's VAR-B. It may be that the demand is larger than at Y but smaller than at Q. It can be seen, however, that Q represents the requirement for VAR-B capacitive VAR's. In the prior art, once the point Y had been passed, capacitive VAR's VAR-B would be utilized and no total VAR output between VAR-A and VAR-B would be possible. However, by using the inductive element once again, as was done previously, a point Z in the VAR demand will produce the exact amount of total VAR's by subtracting inductive VAR's VAR-Z from capacitive VAR's VAR-B, producing demand VAR's VAR-C. This situation may be repeated through as many levels of control as is possible with the utilization of known control system and capacitive elements. Two other ranges of control representing capacitive elements C3 and C4 are shown in the apparatus of FIG. 4 with duplicating inductive control. As is also shown in FIG. 4, hysteresis is provided for the capacitive elements so that switch-out thereof is accomplished at a lower level of VAR demand than switch-in. This has useful practical purposes, including the elimination or minimization of switching transients. The hysteresis is provided to insure that the switching conditions at the end points of the various intervals are not indeterminate.

Referring now to FIGS. 5 through 13, plots of various circuit variables vs. time is shown for a hypothetical VAR demand case. In FIG. 5, in the region K the VAR demand VAR-1 is shown inductive and relatively small. In the region M the VAR demand VAR-2 is shown capacitive and relatively large; and in the region N VAR demand VAR-3 is shown capacitive, but relatively smaller. Positive VAR demand in this case is known as leading VAR demand; and negative VAR demand in this case is known as lagging VAR demand. To achieve the VAR profile shown in the regions K, M and N of FIG. 5, the control system CS of FIG. 3 switches in the capacitive elements at appropriate times and controls the inductive element appropriately. Gate signals GATE-SIG1 and GATE-SIG2 are shown in FIGS. 7 and 10 for switching in capacitors C1 and C3 and C2 and C4, respectively. It will be noted that the voltage across the capacitors C1 and C3, for instance, are positive, indicating a positive charge on those capacitors and the current therethrough $i_{cc1}$ and $i_{cc3}$, respectively, is zero until the first gate pulse GATE-SIG1 is applied at a voltage peak, in which case the current is zero. From thence until the current is extinguished, the currents $i_{cc1}$ and $i_{cc3}$ are sinusoidal. In a like manner, the net negatively charged capacitors, as best shown in FIGS. 9 and 11, are delayed from being interconnected until the negative peak of the voltage is achieved, in which case, those capacitors are switched in to provide sinusoidal current $i_{cc2}$ and $i_{cc4}$, as shown in FIGS. 9 and 10. It will be noted that in the region K (leading VAR demand required) none of the capacitive elements have been switched in and thus no capacitive current $i_{cc1}$ through $i_{cc4}$ flows. The only compensating current is $i_{cL}$, produced in the inductive branch. This current is produced according to the lagging VAR demand required. The net compensating current $i_c$ of region K, as shown in FIG. 13 reflects an appropriate lagging VAR demand provided generally exclusively by the inductive portion of the VAR generator, thus producing lagging VAR demand VAR-1. However, in region M the net capacitive currents $i_{cc3}$ through $i_{cc4}$ are combined with the compensating inductive current $i_{cL}$ to produce a net compensating current $i_c$ in the region M. This produces a leading VAR which closely approximates the VAR demanded VAR-2 in region M. Finally, in order to achieve the relatively low value of leading VAR's VAR-3 shown in region N, capacitive elements C1 and C3 are disconnected at the next positive peak of the control voltage and capacitive element C2 is disconnected at the next negative peak, leaving capacitive element C4 to provide a net capacitive current $i_{cc4}$, which in turn provides a discrete value of leading VAR demand. From the current $i_{cc4}$ is subtracted the current $i_{cL}$, as produced in the region N, which adjusts the discrete negative VAR's produced by the current $i_{cc4}$ to a value which is equal to VAR-3. This is reflected in the total compensating current $i_c$ as shown in region N.

It is to be understood with respect to the embodiments of this invention that the number of capacitive elements chosen is not limiting, nor is the particular switch arrangement. It is also to be understood that any appropriate control system which accomplishes the purposes required may be utilized. It is also to be understood that the circuit is not limited to one inductive element, but may use parallel inductive elements or parallel combinations of series connected inductive elements and thyristor switches. It is also to be understood that the number of discrete steps may be made relatively large, even though control over a continuous range is not obtainable without utilizing the cooperating inductive element in the leading VAR region.

The apparatus taught herein has many advantages. One advantage lies in the fact that continuous control may be obtained in both the leading and lagging VAR regions for a static VAR generator. Furthermore, continuous control may be obtained without the presence of high standby losses. Furthermore, continuous control may be obtained by using relatively smaller circuit elements than would normally be used if VAR control of the type using a fixed capacitor and a thyristor control inductor were used.

What we claim as our invention is:

1. A VAR generator of the type which produces a controlled condution path for reactive current between two conductors in an electrical system, comprising:
   (a) control means for determining whether said reactive current should be capacitive or inductive and for determining the magnitude thereof;

(b) discretely variable capacitance means disposed as part of said conduction path and interconnected with said control means for providing one of any number of fixed available discrete levels of capacitive current through said conduction path when said control means determines net capacitive reactive current is to flow therethrough, the discrete level of capacitive current so applied being the next closest largest available capacitive current to said magnitude of capacitive current as determined by said control means; and (c) continuously variable inductance means disposed as part of said conduction path and interconnected with said control means for providing any level of inductive current in a predetermined range of inductive current through said conduction path when said control means determines net inductive reactive current is to flow therethrough, the level of said inductive current applied being generally equal to said magnitude of inductive current as determined by said control means, said inductance means additionally being controlled by said control means to combine an increment of inductive current with said capacitive current for cancelling a portion of said capacitive current when said control means determines that net capacitive current is to flow through said conduction path, the amount of said inductive current so ordered to be applied being equal to an amount which will cause said net capacitive current to be generally equal to said determined magnitude of capacitive reactive current.

2. The combination as claimed in claim 1 wherein said control means is interconnected at an input thereof with said electrical system for measuring circuit variables in said electrical system for thus determining the magnitude of said reactive current as a function of said circuit variables.

3. The combination as claimed in claim 1 wherein said continuously variable inductance means and said discretely variable capacitance means are interconnected in parallel circuit relationship.

4. The combination as claimed in claim 1 wherein said increment of time comprises the period of one-half cycle of alternating voltage in said electrical system.

5. The combination as claimed in claim 4 wherein said alternating voltage has a frequency of 60 Hz.

6. The combination as claimed in claim 4 wherein said alternating voltage has a frequency of 50 Hz.

7. The combination as claimed in claim 1 wherein said continuously variable inductance means comprises an inductor connected in series circuit relationship with a gated switch, the gate terminal of said gated switch comprising said control terminal, said level of inductive current being determined by the conduction interval of said gated switch as controlled by said control terminal.

8. The combination as claimed in claim 1 wherein said discretely variable capacitance means comprises a plurality of capacitors each of which is connected in series circuit relationship with a controlled switch, each series combination of controlled switch and capacitor being connected in parallel circuit relationship with the others, each controlled switch being interconnected with said control means, said control means actuating any combination of said controlled switches to the on state to place the corresponding capacitors into conduction to provide said predetermined fixed levels of capacitive current.

9. The combination as claimed in claim 1 wherein said level of inductive current which interacts with said level of fixed capacitor current does so by cancelling a portion of said latter current.

* * * * *